(12) United States Patent
Zhu et al.

(10) Patent No.: US 10,385,250 B2
(45) Date of Patent: Aug. 20, 2019

(54) THERMALLY CONDUCTIVE COMPOSITES AND METHOD OF PREPARING SAME

(71) Applicant: Nano and Advanced Materials Institute Limited, Hong Kong (HK)

(72) Inventors: Haojun Zhu, Hong Kong (HK); Changbao Ren, Hong Kong (HK); Lai To Leung, Hong Kong (HK); Kwok Keung Paul Ho, Hong Kong (HK)

(73) Assignee: Nano and Advanced Materials Institute Limited, Hong Kong (HK)

(*) Notice: Subject to any disclaimer, the term of this patent is extended or adjusted under 35 U.S.C. 154(b) by 185 days.

(21) Appl. No.: 15/620,820

(22) Filed: Jun. 12, 2017

(65) Prior Publication Data

US 2017/0355894 A1 Dec. 14, 2017

Related U.S. Application Data

(60) Provisional application No. 62/349,672, filed on Jun. 14, 2016.

(51) Int. Cl.
| | | |
|---|---|---|
| *C09K 5/14* | (2006.01) | |
| *C08K 3/04* | (2006.01) | |
| *C08K 3/34* | (2006.01) | |
| *C08K 7/00* | (2006.01) | |
| *C08K 7/18* | (2006.01) | |

(52) U.S. Cl.
CPC ............... *C09K 5/14* (2013.01); *C08K 3/042* (2017.05); *C08K 3/34* (2013.01); *C08K 7/00* (2013.01); *C08K 7/18* (2013.01); *C08K 2201/001* (2013.01); *C08K 2201/005* (2013.01)

(58) Field of Classification Search
USPC ........................................................ 524/404
See application file for complete search history.

(56) References Cited

U.S. PATENT DOCUMENTS

| | | | |
|---|---|---|---|
| 6,048,919 A | 4/2000 | McCullough | |
| 6,251,978 B1 | 6/2001 | McCullough | |
| 6,710,109 B2 | 3/2004 | McCullough et al. | |
| 6,899,160 B2 | 5/2005 | McCullough | |
| 7,094,822 B2 | 8/2006 | Sagal et al. | |
| 7,189,778 B2 | 3/2007 | Tobita et al. | |
| 8,221,885 B2 | 7/2012 | Miller | |
| 8,741,998 B2 | 6/2014 | l'Abee et al. | |
| 8,946,333 B2 | 2/2015 | Raman et al. | |
| 8,980,984 B2 | 3/2015 | Saga | |
| 9,153,761 B2 | 10/2015 | Takayama et al. | |
| 2003/0040563 A1 | 2/2003 | Sagal et al. | |
| 2010/0020559 A1 | 1/2010 | Janssen et al. | |
| 2013/0207029 A1 | 8/2013 | Janssen et al. | |
| 2016/0046851 A1* | 2/2016 | Choa ........................ B29B 9/16 252/75 |

FOREIGN PATENT DOCUMENTS

| | | |
|---|---|---|
| CN | 102372927 A | 3/2012 |
| CN | 103087404 A | 5/2013 |
| CN | 103205044 A | 7/2013 |
| CN | 103172973 B | 7/2015 |
| CN | 103224638 B | 1/2016 |
| TW | 201107393 A1 | 3/2011 |

OTHER PUBLICATIONS

Geon-Woong Lee et al., Enhanced thermal conductivity of polymer composites filled with hybrid filler, Composites Part A: Applied Science and Manufacturing, May 2006, pp. 727-734, vol. 37, Issue 5.

Jung-Pyo Hong et al., High thermal conductivity epoxy composites with bimodal distribution of aluminum nitride and boron nitride fillers, Thermochimica Acta, Jun. 10, 2012, pp. 70-75, vol. 537.

\* cited by examiner

*Primary Examiner* — Terressa Boykin

(57) ABSTRACT

A method of preparing a thermally conductive composite including: a) mixing 15% to 60% by weight of a polymer matrix with 0% to 85% by weight of a high-aspect-ratio thermally conductive filler having an aspect ratio of at least 5:1; and (b) mixing a polymer melt obtained from step (a) with 0% to 85% by weight of a low-aspect-ratio thermally conductive filler having an aspect ratio of 2:1 or less. By changing the weight ratio, the structure and mechanical properties of the low-aspect-ratio thermally conductive filler and the high-aspect-ratio thermally conductive filler, thermal conductivity anisotropy can be tuned. A thermally conductive composite having thermal conductivity anisotropy in the range from 1 to 4 is also disclosed.

20 Claims, 1 Drawing Sheet

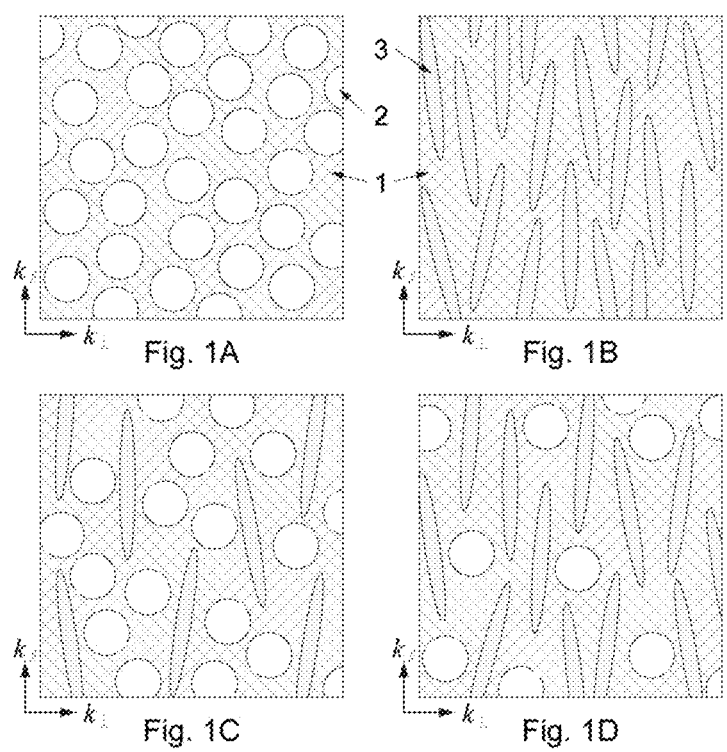

THERMALLY CONDUCTIVE COMPOSITES AND METHOD OF PREPARING SAME

CROSS-REFERENCE TO RELATED APPLICATIONS

This application claims the benefit of U.S. provisional patent application No. 62/349,672, filed on Jun. 14, 2016, the entire content of which is hereby incorporated by reference.

FIELD OF THE APPLICATION

The present application generally relates to heat dissipating articles, and particularly relates to thermally conductive polymer composites. The application also relates to methods of preparing a thermally conductive composite.

BACKGROUND

Heat dissipation of electrical and electronic devices is rather essential, since their performance and/or lifetime may be reduced at elevated temperatures if the generated heat cannot be dissipated efficiently. For example, the lifetime of light emitting diodes (LED) can be extended with a decrease of the junction temperature. In some situations, the lifetime may even be doubled with a decrease of ~10° C. in the junction temperature. With a continuous increase of power density in these devices, fast heat dissipation becomes more and more important.

Traditionally, metals (e.g., aluminum, copper) are widely used in making heat dissipating articles (e.g., heat sinks), mainly due to their high thermal conductivities. However, the manufacturing processes from raw metals to final products, which include machining, tooling, extrusion, etc., greatly limit their geometries. Designs of high heat dissipation efficiencies, usually involve large surface areas and complex geometries, cannot be realized subjected to their manufacturing processes. Even if they are able to be fabricated, the processes are usually long and complicated. Moreover, metals are also highly electrical conductive. Thus, additional processes and/or parts for electrical insulation (e.g., surface insulation coating, adding insulation spacers) are necessary for their use in electrical devices.

Thermally conductive polymer composites, combining good thermal conductivity (TC) and the ability of being molded into complex geometries, are good alternatives of metals in making heat sinks. They can also be electrical insulated, light weight, processed at much lower temperatures than metals, processed compatible with traditional plastic manufactory, etc.

One important and interesting property of thermally conductive polymer composites is the anisotropy of their thermal conductivity. The thermal conductivity of a thermally conductive composite is anisotropic if the in-plane thermal conductivity of a plate sample via injection molding is larger than the through-plane thermal conductivity.

Thermal conductivity of polymers has been traditionally enhanced by addition of thermally conductive fillers, including graphite, carbon fibers, ceramic or metal particles. The performance of the thermal conducting polymers has been affected by filler purity, crystallinity, particle size, and more importantly, affected by three factors, which are the intrinsic thermal conductivity anisotropy of a single crystal of the filler along different crystal directions, the geometry (or aspect ratio) of the filler particles, and the distribution of the particles in the matrix. By changing the above factors, the thermal conductivity anisotropy of the composite can be tuned. It would be useful in the situations of optimizing heat dissipation performance of an article, but its geometry is fixed or does not have much room to change. For instance, thermal conductive composites with high conductivity can be used to replace metals in some applications, for example, as heat sink of LED lighting.

SUMMARY

In a first aspect, the present application provides a method of preparing a thermally conductive composite including:

(a) mixing about 15% to about 60% by weight of a polymer matrix with about 0% to about 85% by weight of a high-aspect-ratio thermally conductive filler having an aspect ratio of at least 5:1, preferably in the range of about 5:1 to about 8:1; and (b) mixing a polymer melt obtained from step (a) with about 0% to about 85% by weight of a low-aspect-ratio thermally conductive filler having an aspect ratio of about 2:1 or less, preferably of about 1:1.

In another embodiment, in conjunction with any of the above and below embodiments, the polymer matrix includes at least one selected from the group consisting of polyethylene (PE), high-density polyethylene (HDPE), polypropylene (PP), acrylonitrile butadiene styrene (ABS), polyamides (PA), polylactide (PLA), polycarbonate (PC), polyphenylene sulfide (PPS), polystyrene (PS), epoxies, silicones, polyurethanes, polyimides, and combinations thereof.

In another embodiment, in conjunction with any of the above and below embodiments, the polymer matrix is a mixture of polypropylene (PP) and polyamides (PA), each at a weight ratio in the range of about 10%-90%.

In another embodiment, in conjunction with any of the above and below embodiments, the polymer matrix is a mixture of high-density polyethylene (HDPE) and polyamides (PA), each at a weight ratio in the range of about 10%-90%.

In another embodiment, in conjunction with any of the above and below embodiments, the high-aspect-ratio thermally-conductive filler has a flake shape.

In another embodiment, in conjunction with any of the above and below embodiments, the high-aspect-ratio thermally-conductive filler includes at least one selected from the group consisting of boron nitride flakes, graphite flakes, expandable graphite, carbon fiber, graphene, molybdenum disulphide ($MoS_2$) whisker, magnesium oxide whisker, aluminium oxide whisker, calcium sulfate whisker, silicon carbide whisker, metal fibers, metal flakes, and combinations thereof.

In another embodiment, in conjunction with any of the above and below embodiments, the low-aspect-ratio thermally-conductive filler has a spherical, almost spherical or irregular shape.

In another embodiment, in conjunction with any of the above and below embodiments, the low-aspect-ratio thermally-conductive filler includes at least one selected from the group consisting of silicon carbide particle, graphite particle, boron nitride (BN) particle, aluminium nitride (AlN) particle, silicon nitride ($Si_3N_4$) particle, alumina particle, magnesium oxide particle, calcium sulfate particle, silicon carbide (SiC) particle, metal particles, and combinations thereof.

In another embodiment, in conjunction with any of the above and below embodiments, the method of preparing a thermally conductive composite further includes adding flame retardants, antioxidants, lubricants, dyes, and/or plasticizers.

In another embodiment, in conjunction with any of the above and below embodiments, the method of preparing a thermally conductive composite further includes pre-treating the fillers with a silane coupling agent selected from the group consisting of (3-aminopropyl)triethoxysilane, (3-glycidyloxypropyl)trimethoxysilane and 3-(trimethoxysilyl) propyl methacrylate.

In another aspect, the present application provides a thermally conductive composite having thermal conductivity anisotropy in the range from 1 to 4, including:

15% to 60% by weight of a polymer matrix;

0% to 85% by weight of a high-aspect-ratio thermally conductive filler having an aspect ratio of at least 5:1, preferably in the range of about 5:1 to about 8:1; and 0% to 85% by weight of a low-aspect-ratio thermally conductive filler having an aspect ratio of about 2:1 or less, preferably of about 1:1; wherein:

the polymer matrix includes at least one selected from the group consisting of polyethylene (PE), high-density polyethylene (HDPE), polypropylene (PP), acrylonitrile butadiene styrene (ABS), polyamides (PA), polylactide (PLA), polycarbonate (PC), polyphenylene sulfide (PPS), polystyrene (PS), epoxies, silicones, polyurethanes, and polyimides;

the high-aspect-ratio thermally-conductive filler includes at least one selected from the group consisting of boron nitride flakes, graphite flakes, expandable graphite, carbon fiber, graphene, molybdenum disulphide (MoS2) whisker, magnesium oxide whisker, aluminium oxide whisker, calcium sulfate whisker, silicon carbide whisker, metal fibers, metal flakes, or combinations thereof; and the low-aspect-ratio thermally-conductive filler includes at least one selected from the group consisting of silicon carbide particle, graphite particle, boron nitride (BN) particle, aluminium nitride (AlN) particle, silicon nitride (Si3N4) particle, alumina particle, magnesium oxide particle, calcium sulfate particle, silicon carbide (SiC) particle and metal particles.

In another embodiment, in conjunction with any of the above and below embodiments, the high-aspect-ratio thermally-conductive filler has a flake shape and the low-aspect-ratio thermally-conductive filler has a spherical, almost spherical or irregular shape.

BRIEF DESCRIPTION OF THE DRAWINGS

FIG. 1A shows a cross-sectional view of a typical embodiment using low-aspect-ratio fillers (1: polymer matrix, 2: low-aspect-ratio fillers).

FIG. 1B shows a cross-sectional view of a typical embodiment using high-aspect-ratio fillers (3: high-aspect-ratio fillers).

FIG. 1C shows a cross-sectional view of a typical embodiment using the mixture of low-aspect-ratio fillers and high-aspect-ratio fillers. The loading amount of former is larger than that of the latter.

FIG. 1D shows a cross-sectional view of a typical embodiment using the mixture of low-aspect-ratio fillers and high-aspect-ratio fillers. The loading amount of former is smaller than that of the latter.

DETAILED DESCRIPTION

The term "aspect ratio" refers to the ratio of the longest side to the shortest side.

The terms "thermal conductivity anisotropy" and "anisotropy of thermal conductivity" refer to the ratio of in-plane to through-plane thermal conductivities.

Reference will now be made in detail to preferred embodiments of thermally conductive polymer composites and methods of tuning thermal conductivity anisotropy of the composites, examples of which are also provided in the following description. Exemplary embodiments of the methods disclosed in the present application are described in detail, although it will be apparent to those skilled in the relevant art that some features that are not particularly important to an understanding of the present application may not be shown for the sake of clarity.

Before the present application is described in further detail, it is to be understood that the terminology used herein is for the purpose of describing particular embodiments only, and is not intended to be limiting, since the scope of the present application will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the application. The upper and lower limits of these smaller ranges may independently be included in the smaller ranges is also encompassed within the application, subject to any specifically excluded limit in the stated range. Where the stated range includes one or both of the limits, ranges excluding either or both of those included limits are also included in the application.

Unless defined otherwise, all technical and scientific terms used herein have the same meaning as commonly understood by one of ordinary skill in the art to which this application belongs. Although any methods and materials similar or equivalent to those described herein can also be used in the practice or testing of the present application, a limited number of the exemplary methods and materials are described herein.

It must be noted that as used herein and in the appended claims, the singular forms "a", "an", and "the" include plural referents unless the context clearly dictates otherwise.

The present application provides a method of preparing a thermally conductive composite including:

(a) mixing about 15% to about 60% by weight of a polymer matrix with about 0% to about 85% by weight of a high-aspect-ratio thermally conductive filler having an aspect ratio of at least 5:1, preferably in the range of about 5:1 to about 8:1; and (b) mixing a polymer melt obtained from step (a) with about 0% to about 85% by weight of a low-aspect-ratio thermally conductive filler having an aspect ratio of about 2:1 or less, preferably of about 1:1.

Optionally, the method of preparing a thermally conductive composite may include adding other additives such as flame retardants, antioxidants, lubricants, dyes, and plasticizers. Objects such as heat sink are in three dimensions so the thermal conductivity anisotropy and the structure of the objects should be considered in real application.

As shown in FIG. 1A, when the polymer matrix is filled with only low-aspect-ratio fillers, it has the same possibility to form thermal conductive pathway in all directions. Therefore, the thermal conductivity is isotropic.

In another situation (FIG. 1B) that the matrix is filled with high-aspect-ratio fillers, during the molding process, the fillers generally tend to align in one direction (e.g., the melt flow direction in the injection molding). In an injection molded article, the thermal conductivity along melt flow direction is usually higher than that in the direction perpendicular to the flow, since the particles are easier to form heat transfer pathway in the flow direction. It is easier to form the heat transport network in that direction and there is less filler-matrix interfaces when heat flows from one surface to another as well. Thus, the thermal conductivity along the flow direction (i.e., in-plane thermal conductivity, $k_∥$) will be higher than that perpendicular to the flow direction (i.e., through-plane thermal conductivity, $k_⊥$). The thermal conductivity becomes anisotropic. The aspect ratio of the filler is more considerable that dictates the conductivities of a composite, because the fillers with large aspect ratio easily form bridges among them, known as conductive network. The formation of random bridges or network from conductive particles facilitates electron and phonon transfer leading to high conductivities.

By mixing the low- and high-aspect-ratio fillers at different ratios, the anisotropy of thermal conductivity can be tuned between the situations shown in FIGS. 1A and 1B. By adding both high-aspect-ratio and low-aspect-ratio fillers in the matrix, as shown in FIG. 1C, the in-plane thermal conductivity of the composite can be enhanced, compared to the situation shown in FIG. 1A. Further increasing the loading amount of high-aspect-ratio filler and/or decreasing the loading amount of low-aspect-ratio filler leads to further increase in the in-plane thermal conductivity (as shown in FIG. 1D).

The material and the loading amount of the thermally-conductive fillers determine not only the value of thermal conductivity, but also the thermal conductivity anisotropy, that is, the ratio of in-plane thermal conductivity ($k_∥$) to through-plane thermal conductivity ($k_⊥$), when using a specific molding method (e.g., injection molding).

Carbon fiber is one of the commonly used thermally-conductive fillers which is of relatively higher cost and has only one preferred orientation. However, most electrical and electronic devices need heat dissipation in more than one dimension. By changing the weight ratio, the structure and mechanical properties of the low-aspect-ratio thermally conductive filler and the high-aspect-ratio thermally conductive filler, thermal conductivity anisotropy can be tuned from 1 to 4. By tuning the thermal conductivity anisotropy of the composite, the present application provides more flexibility in the design of heat sinks, enclosures, and other applications. Simple traditional manufacturing method (e.g., extrusion and injection molding) can also be used to prepare the thermally conductive polymer composites.

In another embodiment, in conjunction with any of the above and below embodiments, the high-aspect-ratio thermally-conductive fillers may have a flake shape, which gives the filers easier processability compared to fibers. The high-aspect-ratio thermally-conductive fillers have more comprehensive heat dissipation performance than the fibers on the plane (in two dimensions). The high-aspect-ratio thermally-conductive fillers may include boron nitride flakes, graphite flakes, expandable graphite, carbon fiber, graphene, molybdenum disulphide ($MoS_2$) whisker, magnesium oxide whisker, aluminium oxide whisker, calcium sulfate whisker, silicon carbide whisker, metal fibers, metal flakes, or combinations thereof. Graphite flakes are preferred.

In another embodiment, in conjunction with any of the above and below embodiments, the low-aspect-ratio thermally-conductive fillers may have a spherical, almost spherical or irregular shape so that the fillers are isotropic or close to isotropic and have easier processability compared to fibers. The low-aspect-ratio thermally-conductive fillers may include silicon carbide particle, graphite particle, boron nitride (BN) particle, aluminium nitride (AlN) particle, silicon nitride ($Si_3N_4$) particle, alumina particle, magnesium oxide particle, calcium sulfate particle, silicon carbide (SiC) particle, metal particles or combinations thereof. Silicon carbide and graphite are preferred due to their relatively good thermal conductivity at quite low cost. Boron nitride is also preferred for its good thermal conductivity and relative ease in process.

In another embodiment, in conjunction with any of the above and below embodiments, The polymer matrix mainly includes thermoplastics, such as polyethylene (PE), polypropylene (PP), acrylonitrile butadiene styrene (ABS), polyamides (PA) such as PA6 and PA66, polylactide (PLA), polycarbonate (PC), polyphenylene sulfide (PPS), and polystyrene (PS), etc. High-density polyethylene (HDPE) is preferred for better thermal conductivity, easy processing and low cost. Polyamides (PA) are also preferred for their good mechanical properties and high working temperatures. Thermosetting polymers, such as epoxies, silicones, polyurethanes, and polyimides, can also be used as the polymer matrix. The polymer matrix can be a single polymer or a mixture of several polymers (usually two polymers). The mixture combines excellent performance of each component. In some embodiments, the polymer matrix may include a mixture of PP and PA or a mixture of HDPE and PA, which can improve mechanical strength of PP or PE and hygroscopicity and dimension stability of PA. The ratio by weight of each component in the mixture may be in the range of 10%-90%.

The high-aspect-ratio thermally-conductive fillers is mixed with the polymer matrix in a first step since fillers such as BN flakes and graphite flakes are lubricating and soft, allowing a throughout mixing of the components. The mixture thus formed will be mixed with low-aspect-ratio thermally-conductive fillers such as SiC and MgO which are rough and hard. This two-step mixing technology improves the ease of processing by enabling more thermally-conductive fillers to be mixed with polymer matrix, thus enhancing the thermal conductivity.

Practically, the main production process of thermally conductive composites involves the use of a co-rotating twin-screw extruder. Before adding to the extruder, the polymer matrix and the fillers are dried in an oven. The temperature and duration depend on the natures of the polymer matrix and the fillers. Optionally, the fillers can be further surface-treated by silane coupling agents to enhance bonding between the fillers and the polymer matrix. Suitable silane coupling agents include (3-aminopropyl)triethoxysilane, (3-glycidyloxypropyl)trimethoxysilane, 3-(trimethoxysilyl)propyl methacrylate, etc. The polymer matrix is added into the extruder from the main feeder located at the beginning of the screw, while the fillers are added into the polymer melt from the side feeder(s) located at the middle of the machine. If two kinds of fillers are added, they are added one by one. The first filler is added into the extruder, mixed with the polymer and the mixture is cut into pellets. After drying, the second filler is added into the composite of polymer and first filler obtained in the last step and then cut into pellets. Besides this method, the two fillers can also be added separately from two side feeders installed on the same extruder or added from a side feeder after pre-mixing the two fillers. After drying the pellets, the thermally conductive composite can be injection molded into desired shape for use.

Examples

Thermally conductive composites were prepared using high-density polyethylene (HDPE) as the polymer matrix, silicon carbide (SiC) particles as the low-aspect-ratio filler (average particle size of 0.5 μm, 10 μm or 50 μm) and graphite flakes as the high-aspect-ratio filler (average particle size of 25 μm).

Silicon carbide (SiC), with a theoretical thermal conductivity of 350~500 W/m·K, is a good candidate for thermal conductivity fillers besides widely used boron nitride (BN) and graphite. Thermal conductivity of SiC is comparable to that of BN perpendicular to c-axis, but much higher than that of BN along c-axis. Moreover, SiC is generally much cheaper than BN. On the other hand, comparing to graphite, SiC is only semiconducting and its volume resistance is much lower than highly electrical conductive graphite.

The thermally conductive composites were injection molded into discs of ~12.7 mm in diameter and ~1 mm in thickness for through-plane thermal conductivity test by flash method according to ASTM E1461. For in-plane thermal conductivity measurement, 11 bars with dimensions of 11 mm×1 mm×1 mm were cut from the above 1-mm-thick discs, rotated by 90° along their long axis, stacked up and held together to form a square sample. The in-plane thermal conductivity was then measured by flash method.

As shown in Table 1, through-plane thermal conductivity ($k_\perp$) of 30 wt % SiC particles (average particle size of 0.5 μm) in HDPE matrix reached 0.524 W/m·K (i.e., example 1). With the increase of the loading amount of the SiC particles from 30 wt % to 85 wt %, $k_\perp$ consistently increased and achieved 3.25 W/m·K (i.e., example 4). SiC particles were connected with each other and formed heat transport network in the polymer matrix of rather low thermal conductivity, thus significantly improved the thermal conductivity of the composite.

TABLE 1

Through-plane thermal conductivity ($k_\perp$) of SiC with different weight loading amounts in HDPE matrix

| Example | HDPE (wt %) | SiC 0.5 μm (wt %) | Through-plane thermal conductivity ($k_\perp$) (W/m · K) |
|---|---|---|---|
| 1 | 70 | 30 | 0.524 |
| 2 | 44 | 56 | 1.01 |
| 3 | 31 | 69 | 1.54 |
| 4 | 15 | 85 | 3.25 |

At similar loading amount, the through-plane thermal conductivity increased with the average particle size of SiC fillers (average particle size of 10 μm or 50 μm). As shown in Table 2, at a similar weight percentage of SiC fillers of around 75~77%, an increase of particle size from 0.5 μm to 50 μm led to an increase of $k_\perp$ from 1.69 W/m·K to 2.81 W/m·K. This was owing to less filler-matrix interfaces in the larger-sized-SiC-particle composite, so that total heat loss on the interface was less.

TABLE 2

Through-plane thermal conductivity ($k_\perp$) of SiC with different particle sizes in HDPE matrix

| Example | HDPE (wt %) | SiC filler average particle size | Wt % | Through-plane thermal conductivity ($k_\perp$) (W/m · K) |
|---|---|---|---|---|
| 5 | 24% | 0.5 μm | 76% | 1.69 |
| 6 | 25% | 10 μm | 75% | 2.10 |
| 7 | 23% | 50 μm | 77% | 2.81 |

If the composite contained only low-aspect-ratio SiC particles with an aspect ratio of 2:1 or less (i.e., example 8), the through-plane and in-plane thermal conductivity were close. $k_\parallel/k_\perp$ ratio was 1.6, as shown in Table 3. When adding high-aspect-ratio graphite flakes (average particle size of 25 μm, aspect ratio of 5:1~8:1), reducing the amount of low-aspect-ratio SiC particles, and keeping the total loading amount of graphite and SiC almost the same (i.e., example 9), $k_\parallel/k_\perp$ ratio of the composite increased from 1.6 to 2.1. When all the SiC particles were replaced by graphite flakes (i.e., example 10), $k_\parallel/k_\perp$ ratio further increased to 2.3. Therefore, by changing the loading ratio between SiC particles and graphite flakes, the anisotropy of thermal conductivity of the composite can be tuned.

TABLE 3

Through-plane and in-plane thermal conductivity of SiC and/or graphite in HDPE matrix

| Example | HDPE (wt %) | SiC 0.5 μm (wt %) | Graphite (wt %) | Through-plane thermal conductivity ($k_\perp$) (W/m · K) | In-plane thermal conductivity ($k_\parallel$) (W/m · K) | $\dfrac{k_\parallel}{k_\perp}$ |
|---|---|---|---|---|---|---|
| 8 | 40% | 60% | 0% | 1.01 | 1.61 | 1.6 |
| 9 | 36% | 44% | 20% | 1.53 | 3.15 | 2.1 |
| 10 | 39% | 0% | 61% | 0.784 | 1.81 | 2.3 |

Similar effects could also be achieved in other filler combinations in HDPE matrix. For example, MgO is a widely-used thermally-conductive oxide. As shown in Table 4, when MgO particles (average particle size of 30 μm, aspect ratio 2:1 or less) were filled in HDPE matrix at 51 wt % loading (i.e., example 11), the composite could achieve both through-plane and in-plane thermal conductivity around 1, that is, $k_\parallel/k_\perp$ ratio was around 1. After adding boron nitride flakes (average particle size of 5~10 μm, aspect ratio of 5:1~10:1), a well-known highly-thermally-conductive ceramic, at 18 wt % loading, $k_\parallel/k_\perp$ ratio increased from 0.93 to 1.3 (i.e., example 12). If only BN flakes were added without MgO particles (i.e., example 13), $k_\parallel/k_\perp$ ratio of the composite reached 3.8.

TABLE 4

Through-plane and in-plane thermal conductivity of MgO and/or BN in HDPE matrix

| Example | HDPE (wt %) | MgO (wt %) | BN (wt %) | Through-plane thermal conductivity ($k_\perp$) (W/m · K) | In-plane thermal conductivity ($k_\parallel$) (W/m · K) | $\dfrac{k_\parallel}{k_\perp}$ |
|---|---|---|---|---|---|---|
| 11 | 49% | 51% | 0% | 1.09 | 1.01 | 0.93 |
| 12 | 46% | 36% | 18% | 1.25 | 1.62 | 1.3 |
| 13 | 47% | 0% | 53% | 1.48 | 5.66 | 3.8 |

Moreover, similar effects could also be achieved in other polymer matrix beside HDPE (e.g., PA66). As shown in table 5 (i.e., examples 14~16), $k_\parallel/k_\perp$ ratio increased from 1.2 to 3.9 with the increase of BN loading amount from 0 wt % to 53 wt %, which was the same as that in the HDPE-MgO-BN composites.

TABLE 5

Through-plane and in-plane thermal conductivity of MgO and/or BN in PA66 matrix

| Example | PA66 (wt %) | MgO (wt %) | BN (wt %) | Through-plane thermal conductivity ($k_\perp$) (W/m · K) | In-plane thermal conductivity ($k_\parallel$) (W/m · K) | $\dfrac{k_\parallel}{k_\perp}$ |
|---|---|---|---|---|---|---|
| 14 | 45% | 55% | 0 | 1.14 | 1.37 | 1.2 |
| 15 | 45% | 28% | 27% | 1.24 | 3.34 | 2.7 |
| 16 | 47% | 0% | 53% | 1.16 | 4.54 | 3.9 |

One of the advantages using engineering plastics, including PA66, is that the mechanical properties (e.g., tensile strength) can be greatly improved, comparing to HDPE. As shown in the examples in Table 6, when the same fillers were used, tensile strength of the composites using PA66 was much larger than that using HDPE.

TABLE 6

Mechanical Properties of BN and/or MgO in HDPE or PA66 matrix

| Example | Matrix | Fillers | Tensile strength (MPa) |
|---|---|---|---|
| 11 | HDPE 49% | MgO 51% | 30.9 |
| 12 | HDPE 46% | BN 18%; MgO 36% | 29.8 |
| 13 | HDPE 47% | BN 53% | 32.8 |
| 14 | PA66 45% | MgO 55% | 63.4 |
| 15 | PA66 45% | BN 27%; MgO 28% | 42.8 |
| 16 | PA66 47% | BN 53% | 55.9 |

Thus, specific methods of preparing a thermally conductive composite and specific thermally conductive composites have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of preparing a thermally conductive composite comprising:
    a) mixing 15% to 60% by weight of a polymer matrix with 10% to 85% by weight of a high-aspect-ratio thermally conductive filler having an aspect ratio of at least 5:1; and
    (b) mixing a polymer melt obtained from step (a) with 10% to 85% by weight of a low-aspect-ratio thermally conductive filler having an aspect ratio of 2:1 or less.

2. The method of claim 1, wherein the high-aspect-ratio thermally conductive filler has an aspect ratio in the range of 5:1 to 8:1.

3. The method of claim 1, wherein the low-aspect-ratio thermally conductive filler has an aspect ratio of 1:1.

4. The method of claim 1, wherein the polymer matrix comprises at least one selected from the group consisting of polyethylene (PE), high-density polyethylene (HDPE), polypropylene (PP), acrylonitrile butadiene styrene (ABS), polyamides (PA), polylactide (PLA), polycarbonate (PC), polyphenylene sulfide (PPS), polystyrene (PS), epoxies, silicones, polyurethanes, polyimides, and combinations thereof.

5. The method of claim 4, wherein the polymer matrix comprises at least one selected from the group consisting of high-density polyethylene (HDPE), polypropylene (PP) and polyamides (PA).

6. The method of claim 4, wherein the polymer matrix is a mixture of polypropylene (PP) and polyamides (PA), each at a weight ratio in the range of 10%-90%.

7. The method of claim 4, wherein the polymer matrix is a mixture of high-density polyethylene (HDPE) and polyamides (PA), each at a weight ratio in the range of 10%-90%.

8. The method of claim 1, wherein the high-aspect-ratio thermally-conductive filler has a flake shape.

9. The method of claim 1, wherein the high-aspect-ratio thermally-conductive filler comprises at least one selected from the group consisting of boron nitride flakes, graphite flakes, expandable graphite, carbon fiber, graphene, molybdenum disulphide ($MoS_2$) whisker, magnesium oxide whisker, aluminium oxide whisker, calcium sulfate whisker, silicon carbide whisker, metal fibers, metal flakes, and combinations thereof.

10. The method of claim 9, wherein the high-aspect-ratio thermally-conductive filler comprises graphite flakes.

11. The method of claim 1, wherein the low-aspect-ratio thermally-conductive filler has a spherical, almost spherical or irregular shape.

12. The method of claim 1, wherein the low-aspect-ratio thermally-conductive filler comprises at least one selected from the group consisting of silicon carbide particle, graphite particle, boron nitride (BN) particle, aluminium nitride (AlN) particle, silicon nitride ($Si_3N_4$) particle, alumina particle, magnesium oxide particle, calcium sulfate particle, silicon carbide (SiC) particle, metal particles, and combinations thereof.

13. The method of claim 12, wherein the low-aspect-ratio thermally-conductive filler comprises silicon carbide particle.

14. The method of claim 1 further comprising adding flame retardants, antioxidants, lubricants, dyes, and/or plasticizers.

15. The method of claim 1 further comprising pre-treating the fillers with a silane coupling agent.

16. The method of claim 15, wherein the silane coupling agent comprises at least one selected from the group consisting of (3-aminopropyl) triethoxysilane, (3-glycidyloxypropyl) trimethoxysilane and 3-(trimethoxysilyl) propyl methacrylate.

17. A thermally conductive composite having thermal conductivity anisotropy in the range from 1 to 4, comprising:
15% to 60% by weight of a polymer matrix;
10% to 85% by weight of a high-aspect-ratio thermally conductive filler having an aspect ratio of at least 5:1; and
10% to 85% by weight of a low-aspect-ratio thermally conductive filler having an aspect ratio of 2:1 or less;
wherein:
the polymer matrix comprises at least one selected from the group consisting of polyethylene (PE), high-density polyethylene (HDPE), polypropylene (PP), acrylonitrile butadiene styrene (ABS), polyamides (PA), polylactide (PLA), polycarbonate (PC), polyphenylene sulfide (PPS), polystyrene (PS), epoxies, silicones, polyurethanes, and polyimides;
the high-aspect-ratio thermally-conductive filler comprises at least one selected from the group consisting of boron nitride flakes, graphite flakes, expandable graphite, carbon fiber, graphene, molybdenum disulphide ($MoS_2$) whisker, magnesium oxide whisker, aluminium oxide whisker, calcium sulfate whisker, silicon carbide whisker, metal fibers, metal flakes, or combinations thereof; and
the low-aspect-ratio thermally-conductive filler comprises at least one selected from the group consisting of silicon carbide particle, graphite particle, boron nitride (BN) particle, aluminium nitride (AlN) particle, silicon nitride ($Si_3N_4$) particle, alumina particle, magnesium oxide particle, calcium sulfate particle, silicon carbide (SiC) particle and metal particles.

18. The thermally conductive composite of claim 17, wherein the high-aspect-ratio thermally conductive filler has an aspect ratio in the range of 5:1 to 8:1.

19. The thermally conductive composite of claim 17, wherein the low-aspect-ratio thermally conductive filler has an aspect ratio of 1:1.

20. The thermally conductive composite of claim 17, wherein the high-aspect-ratio thermally-conductive filler has a flake shape and the low-aspect-ratio thermally-conductive filler has a spherical, almost spherical or irregular shape.

* * * * *